Dec. 4, 1945. H. P. KUPIEC ET AL 2,390,311

HYDRAULIC BRAKE

Filed Oct. 28, 1943

INVENTOR.
HARRY P. KUPIEC
BY EARLE STEWART

George Douglas Jones
ATTORNEY

Patented Dec. 4, 1945

2,390,311

UNITED STATES PATENT OFFICE 2,390,311

HYDRAULIC BRAKE

Harry P. Kupiec and Earle Stewart, Baltimore, Md., assignors to The Glenn L. Martin Company, Middle River, Md., a corporation of Maryland Application October 28, 1943, Serial No. 507,986

15 Claims. (Cl. 188—152)

This invention generally relates to an improved hydraulic brake, and more particularly to the expander mechanism to force the brake-blocks into engagement with the brake-drum.

This brake is of the class generally referred to as a hydraulic brake, in that the actuating mechanism is operated by a source of hydraulic pressure. In brakes of this type, it is necessary that the brake-block be forced against the brake-drum lining with enough force to stop the rotation of the drum within a predetermined time and with a minimum of lag between the actuation of the control pedal for the hydraulic fluid and the application of the brake-blocks to the brake-drum. In other words, as soon as the brake pedal is depressed, the effect of the brake and the feel of the brake should be immediately noticeable in the brake pedal. In most hydraulic brakes, there is a noticeable lag between the operation of the brake-pedal and the braking-action of the brake-blocks.

An object of this invention is to provide a hydraulic brake of greater efficiency and of simple construction that will be easily manufactured, assembled, and serviced.

Another object of this invention is the provision of a brake actuator that will exert equal force simultaneously on all brake-blocks, thus equalizing wear and exerting a maximum braking action on the brake-drum.

Another object of the invention is the provision of a quick-acting hydraulic brake, that is, one in which the effect of a brake pedal is immediately noticeable in the operation of the vehicle upon which it is mounted.

Another object of the invention is the provision of a hydraulic brake that will utilize a lesser volume of hydraulic fluid than any known equivalent braking mechanism.

A further object of the invention is the provision of a brake-actuator that will give positive braking-action and an instant release of the brake-blocks to the normal inoperative position upon the reduction of the application of the hydraulic pressure.

Further and other objects will become apparent from the description of the accompanying drawing which forms a part of this disclosure and in which like numerals refer to like parts.

Figure 1:
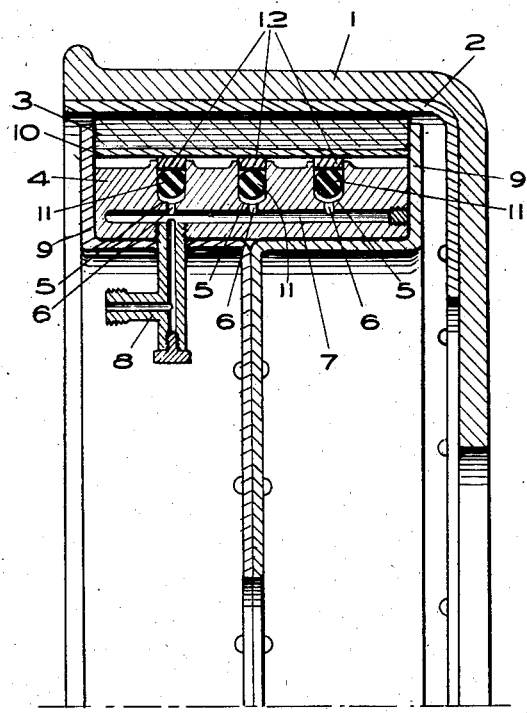
Figure 1 is a fragmentary section through the brake-drum and actuator mechanism.
Figure 2:
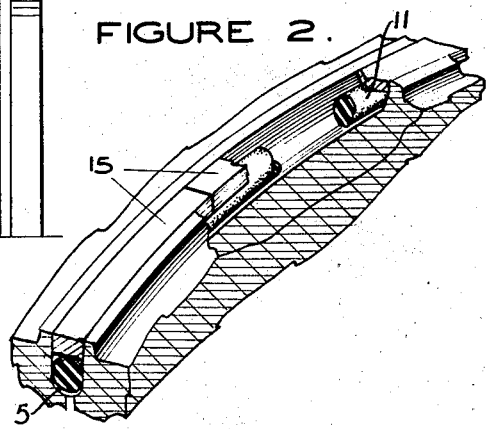
Figure 2 is a fragmentary perspective view showing details of the actuating mechanism.
Figure 4:
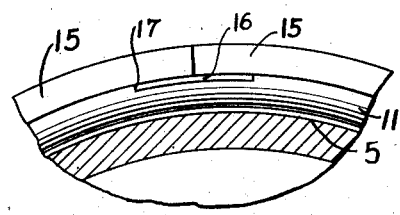
Figure 4 is a fragmentary sectional view showing a portion of the brake actuator adjacent a gap in the segmental ring.

The principal features of this hydraulic brake are shown in Figures 1 and 2.

Figure 1 illustrates a brake-drum 1 having a lining 2 which may be mounted on the wheel of the vehicle in the conventional manner. A plurality of brake-blocks 3 are mounted on an expander or actuator adjacent the brake-drum. The actuator for brake-blocks 3, comprises a cylindrical member 4 having grooves 5 formed in the periphery thereof. These grooves, in the preferred embodiment of the invention, are formed with straight, parallel side-walls. These grooves are connected with a source of hydraulic pressure by means of passages 6 which connect the grooves to passage 7. Hydraulic fluid is conducted to passage 7 through fitting 8. The cylindrical member 4 is mounted in flanged retainers 9 which also may act as aligning guides for the brake-blocks 3. Brake-blocks 3 extend around the cylindrical member 4 in a conventional fashion and are adapted for motion radially outwardly to engage the lining of the brake-drum upon the application of hydraulic pressure to the actuator. They are retained against axial motion by some means, such as flanges on retainers 9. Brake-blocks 3 consist of a non-metallic composition and which may have a metal backing member 10 which serves to reinforce the brake-block, and further serves to distribute the force from the actuator uniformly over the brake-block.

Resilient elastic gasket members 11 are placed in grooves 5. As shown in Figure 1, these gaskets are of rubber or any suitable elastic plastic material of annular formation and circular in cross-section. It is necessary that each gasket be of such a diameter that when in place in a groove, it will contact the side walls and seal the fluid in the lower portion of the groove. Ring 12, made up of segments 15, is placed in the groove on top of the gasket member and together with the gasket, acts as a piston. The segmental ring is placed in the groove with a sliding fit so that as the fluid pressure is applied to the groove, the gasket member seals the groove against passage of the fluid and transmits the fluid pressure to the segmental ring, which moves radially outwardly, pushing the brake-blocks into contact with the brake-drum lining for braking action. It is obvious that the ring in the groove must be of a segmental construction so that as the elastic member moves outwardly in the groove, the ring segments transmit the pressure directly and equally to the brake-blocks.

Upon the release of the hydraulic fluid pressure in the system, due to the elastic nature of the gaskets, they immediately return to the normal position, thereby permitting the brake-blocks to be retracted from contact with the brake-drum lining by springs or other equivalent means.

Figure 3:
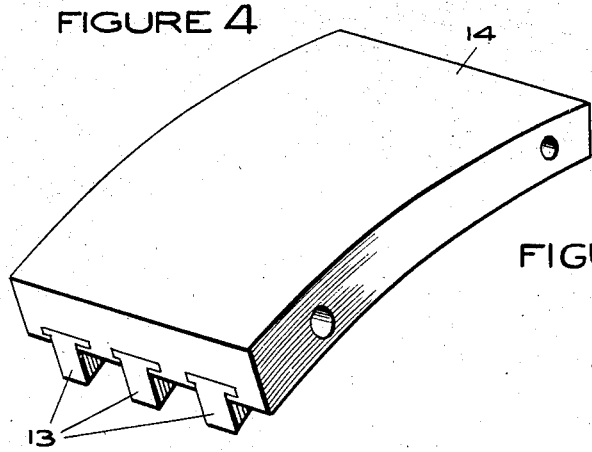
Figure 3 shows a modified form of brake-blocks for use with the actuating mechanism.

The form of brake-blocks shown in Figure 3 may be used in conjunction with the same actuator and gasket assembly shown in Figure 1, as the ring segments 13 are molded into, or integral with, the brake-blocks 14 to form a unitary structure which is otherwise similar in structure and function as brake-block 2. In this form of the invention, the resilient gasket members transmit the fluid pressure to members 13 acting as pistons in grooves 5 and the force of the fluid pressure is directly transmitted to the brake-block 14.

It will be noted that due to the small space between the bottom part of the groove and the resilient elastic gasket member and also the small amount of motion of the gasket member in the groove, a very small amount of hydraulic fluid is necessary for the full actuation of the brake. This results in the almost instant application of braking force to the brake-drum upon the release of fluid pressure by the brake pedal. Other known types of hydraulic brakes involve a brake expander which has a greater volumetric capacity for the same braking action, thus causing an undesirable lag between the application of the brake and the effect of the brake.

It should be pointed out that hydraulic brakes in general are objectionable because they require relatively low operating pressures which are difficult to control when applied over a small range. The actuators usually have a large area and can only be operated with a small range of working pressures. The brake construction herein described permits using large fluid pressures. This is particularly valuable in vehicles having fluid pressure systems with operating pressures around 1000 to 3000 pounds per square inch. These pressures may be applied directly to the subject brake over a wide range and allow better control for applying the brakes. When low pressure brakes are used on a vehicle having a high pressure hydraulic system, reducer valves and other controls are necessary to cut the pressure down to low working ranges. The present brake thus eliminates many of the complications and parts involved with the use of a low pressure brake with a high pressure system.

The ring which extends between the gasket member 11 and the brake-block is indicated as a segmental ring. It is obvious that it may be of as many parts as necessary to give uniform application of the force from the fluid pressure to the brake-blocks.

The relative movement of the segmental ring with respect to the groove, determines the spacing between the adjacent segments of the ring. If this spacing is such that the gasket member may be extruded into the space by the hydraulic pressure, a sliding cover means 16 may be arranged over the gap to prevent the extrusion of the gasket. The sliding cover means may, for example, consist of a strip 16 extending over the gap between portions 15 of the segmental ring. Member 16 may be welded such as at 17 or bonded in any manner to one or the other of the segmental sections to secure member 16 in place.

The brake specifically described and illustrated in the preferred embodiment is shown having a plurality of grooves and rings but for brakes on small, light vehicles, a single expander gasket will suffice.

In the form of the invention illustrated in the figures, the groove is shown having straight sidewalls and a rounding bottom. The shape of the bottom is not important except that the form of the bottom relative to the shape of the gasket may be made so that a minimum quantity of hydraulic fluid will be needed in the hydraulic system. The gasket itself in the form illustrated, is shown of circular cross-section, but any cross-section that will transmit the fluid pressure to the segmental ring or equivalent structure and also provide an adequate seal for the hydraulic fluid will be satisfactory.

It is to be understood that certain changes, alterations, modifications and substitutions can be made without departing from the spirit and scope of the appended claims.

We claim as our invention:

1. In a device of the class described, a brake-drum, brake-blocks adapted to engage said brake-drum, actuating means therefor comprising a cylindrical member backing said brake-blocks, said member having grooves formed in the periphery thereof, passages formed in said member interconnecting said grooves and affording communication with a source of fluid pressure, resilient, elastic gaskets positioned in said grooves substantially filling the same, whereby said fluid pressure urges said gaskets radially to force said brake-blocks against said brake-drum.

2. In a brake of the class described, having a brake-drum, a plurality of brake-blocks adapted to be moved radially into contact with said brake-drum, means to move said brake-blocks comprising a cylindrical member affording a backing for said brake-blocks, said cylindrical member having a plurality of annular grooves formed in the cylindrical wall thereof, resilient annular gaskets substantially filling said grooves, fluid passages interconnecting said grooves, and connected to a source of fluid pressure, whereby said gaskets may be moved radially in said grooves to move said brake-blocks against said brake-drum.

3. In a device of the class described, a brake-drum, brake-blocks adapted to engage said brake-drum, actuating means therefor comprising a cylindrical member backing said brake-blocks, said member having grooves formed in the periphery thereof, a segmental ring member positioned in said grooves engaging the walls of said grooves with a sliding fit, said segmental rings being normally flush with the edges of said grooves, passages formed in said cylindrical member interconnecting said grooves and affording communication with a source of fluid pressure, resilient, elastic gaskets positioned in said grooves under said segmental ring, whereby the fluid under pressure is sealed in the groove but the force of the fluid pressure is transmitted by said gaskets, to said segmental ring and to said brake-blocks.

4. In a brake of the class described, having a brake-drum, a plurality of brake-blocks adapted to be moved radially into contact with said drum, an actuator and mount for said brake-blocks comprising a cylindrical member having a plurality of annular grooves in the periphery thereof, said brake-blocks having ribs secured to the side adjacent said cylindrical member and adapted to engage the grooves therein with a sliding fit, means forming passages interconnecting said grooves and affording communication with a source of fluid pressure, resilient, elastic gasket means in said grooves in contact with the side walls thereof, and said rib members.

5. In a brake of the class described, having a brake-drum, a plurality of brake-blocks adapted to be moved radially into contact with said drum, an actuator and mount for said brake-blocks comprising a cylindrical member having at least one relatively narrow annular groove in the periphery thereof, said brake-blocks having a rib secured to the side adjacent said cylindrical member filling said groove and adapted to engage the walls of said groove with a sliding fit, means forming a passage interconnecting said groove with a source of fluid pressure, resilient, elastic gasket means in said groove in contact with the side walls thereof, and said rib member, whereby said fluid pressure urges said gasket bodily, radially to force said brake-blocks against said brake-drum.

6. In a device of the class described, a cylindrical drum member, drum-engaging members adapted to be moved into contact with said drum member, actuating means therefor comprising a cylindrical member backing said drum-engaging members, said cylindrical backing member having grooves formed in the periphery thereof, passages formed in said member interconnecting said grooves and affording communication with a source of fluid pressure, resilient, elastic gaskets positioned in said grooves substantially filling the same, whereby said fluid pressure urges said gaskets radially to force said drum-engaging members against said drum member.

7. In a device of the class described, a cylindrical drum member, drum-engaging members adapted to engage said cylindrical drum member, actuating means therefor comprising a cylindrical member backing said drum-engaging members, said cylindrical member having at least one relatively narrow groove formed in the periphery thereof, a passage formed in said member for conducting fluid to said groove from a source of fluid pressure, a resilient elastic gasket positioned in said groove substantially filling the same, the sides of said elastic gasket being contiguous with the walls of the groove, whereby said fluid pressure urges said gasket bodily, radially to force said drum-engaging members against said cylindrical drum member.

8. In a device of the class described, a cylindrical drum member, drum-engaging members adapted to be moved into contact with said drum member, actuating means therefor comprising a cylindrical member backing said drum-engaging members, said cylindrical backing member having grooves formed in the periphery thereof, passages formed in said member interconnecting said grooves and affording communication with a source of fluid pressure, resilient, elastic gaskets positioned in said grooves substantially filling the same, segmental ring members positioned in said grooves engaging the walls of said grooves with a sliding fit placed between said gaskets and said drum-engaging members, whereby said fluid pressure urges said gaskets radially to force said drum-engaging members against said drum member.

9. A radial brake comprising an outwardly opening channel brake rim, an annular member supported within said channel and having a narrow channel at the outer face thereof as compared with said first channel, an annular sealing ring adapted to be supported in said second channel and capable of radial expansion and contraction, radial expansible brake elements supported in said first channel, and means to direct fluid under pressure into said second channel against said sealing ring to radially expand the same to actuate said brake element.

10. A radial brake assembly comprising a channel shaped rim, brake blocks supported in said rim for radial expansion and contraction, means defining annular channel portions disposed radially inward from said brake block and opening radially outward, said channel portions being axially spaced from each other and from the side walls of said channel shaped rim, pressure sealing members disposed in said channel portions adapted to be radially expanded and contracted, and radially expansible and contractable thrust means disposed between said sealing means and said brake blocks.

11. A radial brake comprising a main peripheral portion, radially expansible and contractable brake elements supported in said peripheral portion, means defining a narrow channel in said portion, said channel opening radially outward and being directly adjacent to and bridged by said brake element, an annular sealing member supported in said channel and adapted to be radially expanded, means for directing fluid pressure into said channel against said sealing means to radially expand the same, and thrust means disposed between said sealing means and said brake elements.

12. In a device of the class described a cylindrical drum member, drum engaging means adapted to engage said cylindrical drum member, actuating means therefor comprising a cylindrical member backing said drum engaging members, said members having at least one groove narrow relative to said drum engaging means formed in the periphery thereof, a passage formed in said member for conducting fluid to said groove from the source of fluid pressure, a segmental annular member extending into said groove engaging the walls thereof with a sliding fit, a resilient elastic gasket positioned in said groove between the bottom of the groove and said segmental member, the sides of said elastic gasket being contiguous with the walls of the groove, whereby said fluid pressure urges said gasket radially to force said drum engaging members against said cylindrical drum members, and a sliding cover means arranged over the joints of the segmental member to prevent extrusion of said gasket, during application of pressure to said gasket.

13. In a device of the class described, a brake drum, brake blocks adapted to engage said brake drum, actuating means therefor comprising a cylindrical member backing said brake blocks, said member having grooves formed in the periphery thereof, a segmental ring member positioned in each of said grooves engaging the walls of said grooves with a sliding fit, said segmental rings being normally flush with the edges of said grooves, passages formed in said cylindrical member interconnecting said grooves and affording communication with a source of fluid pressure, a resilient, elastic gasket positioned in each of said grooves under each segmental ring, whereby the fluid under pressure is sealed in the groove but the force of the fluid pressure is transmitted by said gaskets to said segmental ring and to said brake blocks, and a sliding cover means arranged over the joints of said segmental rings to prevent extrusion of said gaskets, during application of pressure to said brake.

14. A radial brake assembly comprising a channel-shaped rim, brake blocks supported in said rim for radial expansion and contraction, means defining annular channel portions disposed radially inward from said brake block and opening radially outward, said channel portions being axially spaced from each other and from the side wall of said channel-shaped rim, pressure sealing means disposed in said channel portions adapted to be radially expanded and contracted and annular segmental means disposed between said sealing means and said brake blocks and a sliding cover means arranged over the joints of said segmental means to prevent extrusion of said pressure sealing members, during application of pressure to said brake.

15. In a device of the class described, a brake drum, brake blocks adapted to engage said brake drum, actuating means therefor comprising a cylindrical member backing said brake blocks, said member having grooves formed in the periphery thereof, a segmental annular member extending into said grooves engaging said walls of said grooves with a sliding fit, fluid pressure actuated, radially expanding means positioned between the bottoms of said grooves and said segmental members to urge said segmental member and said brake blocks radially into contact with said brake drum.

HARRY P. KUPIEC.
EARLE STEWART.